(12) United States Patent
Stark et al.

(10) Patent No.: US 11,806,915 B2
(45) Date of Patent: Nov. 7, 2023

(54) SYSTEMS AND METHODS FOR FILLING CONTAINERS WITH LINERS

(71) Applicants: Justin Paul Stark, Stafford, TX (US); Kristy Anne Plaut, Stafford, TX (US)

(72) Inventors: Justin Paul Stark, Stafford, TX (US); Kristy Anne Plaut, Stafford, TX (US)

(*) Notice: Subject to any disclaimer, the term of this patent is extended or adjusted under 35 U.S.C. 154(b) by 98 days.

(21) Appl. No.: 17/510,711

(22) Filed: Oct. 26, 2021

(65) Prior Publication Data
US 2022/0040899 A1 Feb. 10, 2022

(51) Int. Cl.
*B29C 49/24* (2006.01)
*B65D 25/14* (2006.01)
*B29L 31/00* (2006.01)

(52) U.S. Cl.
CPC .............. *B29C 49/24* (2013.01); *B65D 25/14* (2013.01); *B29C 2049/2404* (2013.01); *B29C 2049/2443* (2013.01); *B29L 2031/712* (2013.01)

(58) Field of Classification Search
CPC ............ B29C 49/24; B29C 2049/2443; B29C 2049/2404; B65D 25/14; B29L 2031/712
See application file for complete search history.

(56) References Cited

U.S. PATENT DOCUMENTS

| 3,450,254 A | 6/1969 | Miles |
| 2009/0212071 A1* | 8/2009 | Tom ...................... B65B 31/003 222/105 |

FOREIGN PATENT DOCUMENTS

| CN | 109850438 A | 6/2019 |
| CN | 210192435 U | 3/2020 |
| CN | 210213567 U | 3/2020 |
| FR | 2676958 A1 | 12/1992 |
| FR | 2916674 A1 | 12/2008 |

* cited by examiner

*Primary Examiner* — Monica A Huson

(57) ABSTRACT

A system, that includes a container, that includes a first container opening, a liner disposed in the first container opening, a pump connected to the container, and a controller, where the controller is programmed to perform a method for filling the container with the liner, that includes making a first determination that a power on condition is satisfied, in response to the first determination, providing power to the pump, and after providing the power to the pump, making a second determination that a power off condition is satisfied, and in response to the second determination, cutting the power to the pump.

20 Claims, 6 Drawing Sheets

SYSTEMS AND METHODS FOR FILLING CONTAINERS WITH LINERS

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

SUMMARY

In general, in one aspect, embodiments relate to a system, that includes a container, that includes a first container opening, a liner disposed in the first container opening, a pump connected to the container, and a controller, where the controller is programmed to perform a method for filling the container with the liner, that includes making a first determination that a power on condition is satisfied, in response to the first determination, providing power to the pump, and after providing the power to the pump, making a second determination that a power off condition is satisfied, and in response to the second determination, cutting the power to the pump.

In general, in one aspect, embodiments relate to a non-transitory computer readable medium that includes instructions which, when executed by a computer processor, enables the computer processor to perform a method for filling a container with a liner, that includes making a first determination that a power on condition is satisfied, in response to the first determination, providing power to a pump, and after providing the power to the pump, making a second determination that a power off condition is satisfied, and in response to the second determination, cutting the power to the pump.

In general, in one aspect, embodiments relate to a method for filling a container with a liner, that includes making a first determination that a power on condition is satisfied, in response to the first determination, providing power to a pump, and after providing the power to the pump, making a second determination that a power off condition is satisfied, and in response to the second determination, cutting the power to the pump.

Other aspects of the invention will be apparent from the following description and the appended claims.

DETAILED DESCRIPTION

Figure 1:
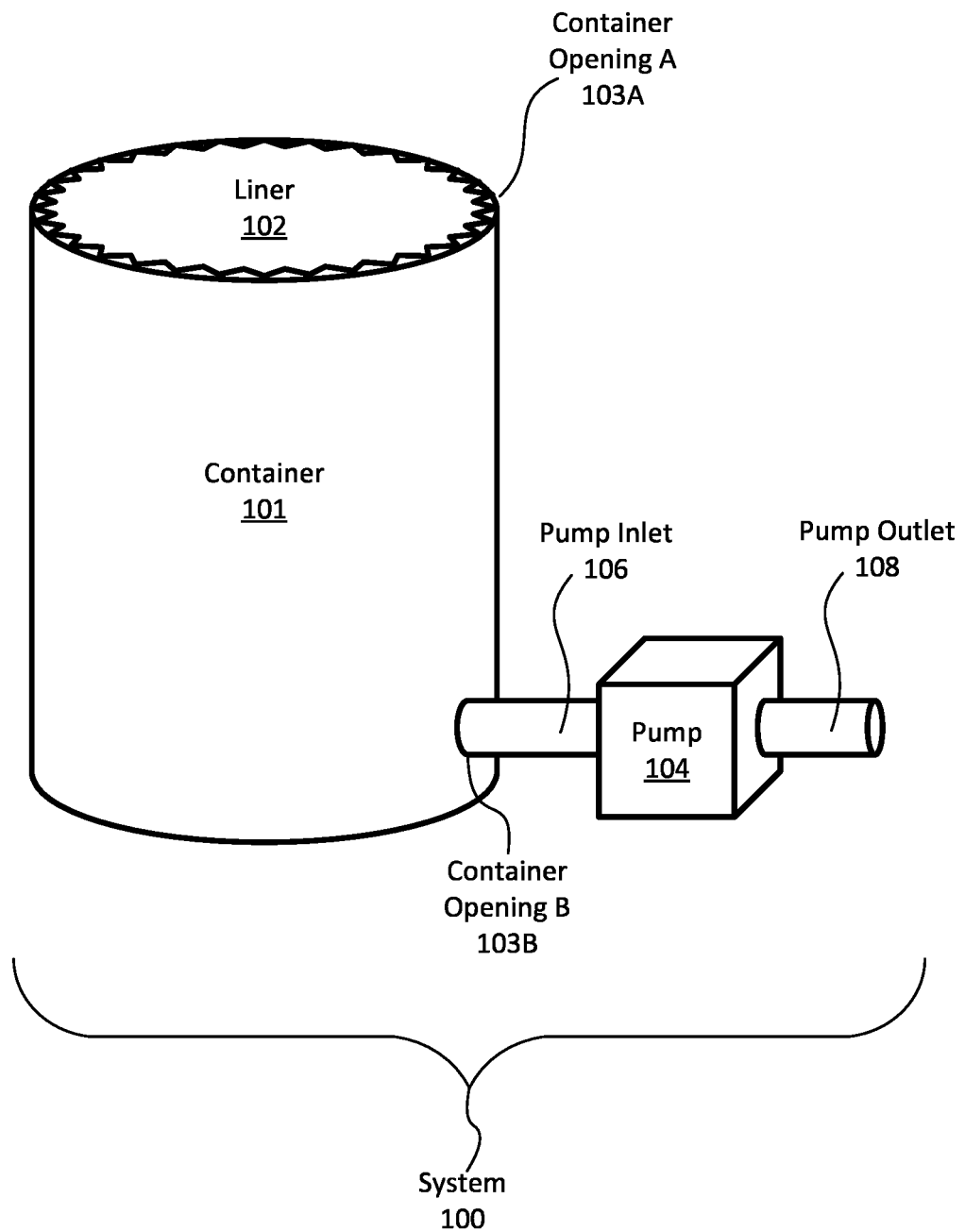
FIG. 1 shows a diagram of a system, in accordance with one or more embodiments of the invention.

In general, embodiments of the invention relate to systems and methods for filling containers with liners. The systems and methods described herein allow for efficient utilization of the liner by maximizing the internal volume of the liner when installed inside the container. One method to maximize the internal volume of the liner is to generate a lower gaseous pressure inside the container (relative to the environment surrounding the container), thereby causing the liner to expand inside the container as the liner fills the volume of lower gaseous pressure.

Further, in general, embodiments of the invention relate to systems and methods for automating the process of filling containers with liners by allowing for reduced user interaction with the liner and container. Accordingly, a user of the system may be able to push a button (or speak a specific phrase aloud) which, in turn, causes one or more controller(s) to turn on a pump that generates a gaseous pressure difference between sides of the liner.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details, known to those of ordinary skill in the art, may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element—unless expressly disclosed, such as by the use of the terms "before", "after", "single", and other such terminology. Rather, the use of ordinal numbers is to distinguish between elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct connection (e.g., a wired or wireless connection directly between two devices) or indirect connection (e.g., wired and/or wireless connections between any number of intermediary devices connecting the operatively connected devices).

FIG. 1

FIG. 1 shows a diagram of a system, in accordance with one or more embodiments of the invention. A system (e.g., system (100)) may include a container (e.g., container (101)), a liner (e.g., liner (102)), a pump inlet (e.g., pump inlet (106)), a pump (e.g., pump (104)), and a pump outlet (e.g., pump outlet (108)). Each of these components is described below.

In one or more embodiments of the invention, a container (101) is a structure that includes a hollow interior. A container (101) may have one or more container opening(s) (e.g., container opening A (103A) where the liner (102) is disposed, and container opening B (103B) where the pump inlet (106) is disposed). In one or more embodiments of the invention, the container (101) is constructed from materials(s) more rigid than the material(s) constructing the liner (102). Non-limiting examples of a container (101) include a canister, box, bin, basket, bottle, refuse receptacle (trash can, dumpster), or any other hollow structure.

In one or more embodiments of the invention, a liner (102) is a structure that may expand (i.e., inflate) due to a difference in gaseous pressures between an internal volume of the liner (102) and the external environment surrounding the liner (102). Accordingly, by creating a difference in gaseous pressure between two sides of the liner (102), the liner (102) may be expanded. Further, the liner (102) may be expanded to fill the container.

As a non-limiting example, a liner (102) may be expanded by forcing gas (e.g., air) into an open end on one side of the liner (102) thereby increasing the gaseous pressure inside the liner (102) compared to the surrounding ambient gaseous pressure. As another non-limiting example, a liner (102) may be expanded by removing gas (e.g., air) from one side of the liner (102) causing the liner (102) to expand into the volume of lower gaseous pressure. In either case, the liner (102) expands as gas fills the liner's (102) interior from the side with the comparatively higher gaseous pressure. Non-limiting examples of a liner (102) include a trash bag, a balloon, and/or any liner capable of being expanded.

In one or more embodiments of the invention, the liner (102) may be constructed from an elastic material that stretches when the liner (102) is expanded (e.g., like a balloon). In such embodiments, the liner (102) may maintain a higher gaseous pressure inside the volume formed by the liner (102) (i.e., its interior) and deflate if the interior and exterior of the liner (102) are exposed to equal gaseous pressure.

In one or more embodiments of the invention, a liner (102) may be constructed from a flexible material (e.g., polyethylene) which expands by unfolding (i.e., unraveling, straightening out, etc.). In such embodiments, when expanded, the gaseous pressure inside and outside of the liner (102) are relatively equal. Accordingly, in such embodiments, the liner (102) does not deflate when the internal volume of the liner (102) is exposed to the same ambient gaseous pressure that surrounds the liner (102).

In one or more embodiments of the invention, the liner (102) may be bounded by a band of elastic material (i.e., an "elastic band", not shown). In such embodiments, the elastic band may stretch when placed under tension and return to a smaller size when that tension is released. Thus, when stretched, the elastic band may be placed over an opening of a container (101) (i.e., container opening A (103A))—where container opening A (103A) is larger than the non-stretched elastic band. Then, when tension is reduced on the elastic band, the elastic band shrinks to match the convex contours of container opening A (103A)—thereby forming a seal that may reduce the flow of fluid through container opening A (103A) and may also securely affix the liner (102) to the container (101).

In one or more embodiments of the invention, a liner (102) may be chosen to match the size and/or shape of the container (101) to which the liner (102) is installed. As a non-limiting example, if the container (101) is a 13-gallon trash can, the liner may be a 13-gallon trash bag. As another non-limiting example, if the container (101) is a 60-gallon trash can, the liner may be a 60-gallon trash bag. As another non-limiting example, if the container (101) is a 35-fluid-ounce cylindrical bottle, the liner may be a 35-fluid-ounce cylindrical plastic liner. One of ordinary skill in the art, having the benefit of this detailed description, would appreciate that any aforementioned possible containers (101) may be paired with a liner (102) of respective size and/or shape. Further, a liner (102) may be over- or under-sized for the container (101) (e.g., a 13-gallon trash bag may be fully expanded inside a 60-gallon trash can, or a 60-gallon trash bag may be partially expanded in a 13-gallon trash can, etc.). Further, a liner (102) may be constructed from a combination of two or more suitable materials to allow for appropriate shape and expansion (e.g., flexible material(s), elastic material(s), rigid portion(s), and/or any combination thereof).

In one or more embodiments of the invention, a pump inlet (106) is one or more hollow physical structure(s) that allows for the passage of fluids from a first volume (e.g., container (101)) into the pump (104). The pump inlet (106) may be made from a rigid material, a flexible material, or any combination thereof. Further, the pump inlet (106) may be any suitable length to allow for a pump (104) to be placed in a desirable location (e.g., behind the container (101), at a higher elevation than container opening B (103B), etc.).

As a non-limiting example, the pump inlet (106) may be constructed from a rigid (e.g., metal) elbow and a flexible hose, where the rigid elbow threads into a lower side of the container (101) (i.e., through container opening B (103B)) and bends to direct airflow upward. Then, the flexible hose may be connected to the rigid elbow and continue upward before terminating at the pump (104) mounted near the top of the container (101).

In one or more embodiments of the invention, a pump (104) is a device that moves fluids (i.e., gases or liquids) from one volume to a second volume. A pump may move fluids at a flow rate measured by volume per unit time (e.g., gallons per minute, liters per second, cubic-feet per hour, etc.). A pump may be powered by any means required to perform the operations of moving fluids from a first volume to a second volume (e.g., electricity, combustible fuel, hand powered, etc.).

In one or more embodiments of the invention, a pump (104) may be a vacuum pump that moves gases from inside a container (101) to outside a container (101), thereby creating a partial vacuum inside the container (101) (a volume of comparatively lower gaseous pressure compared to the surrounding environment).

In one or more embodiments of the invention, in order to move fluid from a first volume (e.g., a container (101)), the pump (104) is connected to the first volume via a pump inlet (106). Further, to move the fluid to a second volume (e.g., the surrounding environment), the pump (104) may be connected to the second volume via a pump outlet (108).

In one or more embodiments of the invention, a pump outlet (108) is a hollow physical structure that allows for the passage of fluids from the pump (106) into a second volume. Similar to the pump inlet (106), the pump outlet (108) may be made from rigid and/or flexible materials and may be any suitable length and shape.

While FIG. 1 shows a specific configuration of a system, other configurations may be used without departing from the scope of the invention. Accordingly, embodiments disclosed herein should not be limited to the configuration of devices and/or components shown in FIG. 1.

FIG. 2

Figure 2:
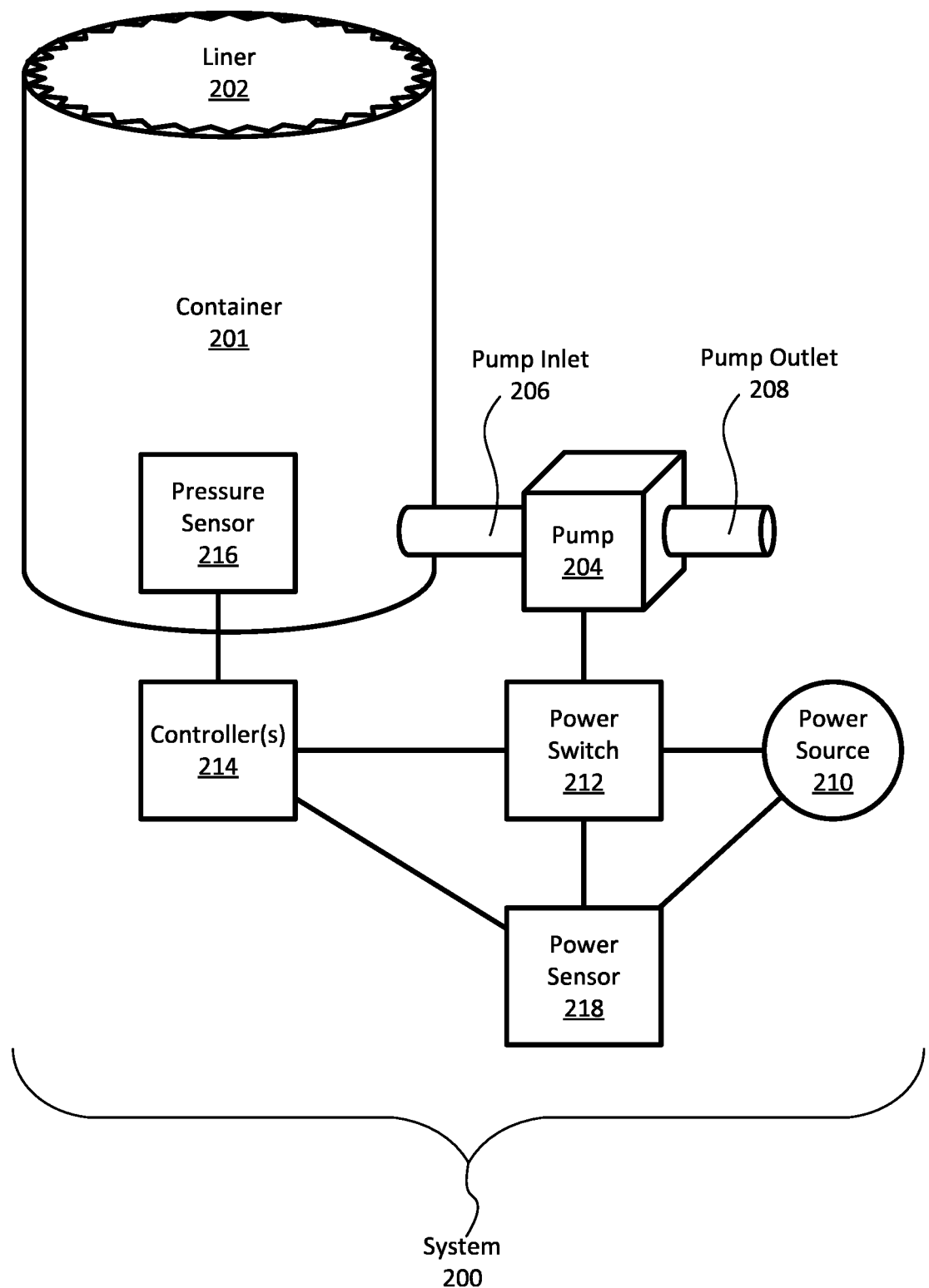
FIG. 2 shows a diagram of a system, in accordance with one or more embodiments of the invention.

FIG. 2 shows a diagram of a system, in accordance with one or more embodiments of the invention. A system (e.g., system (200)) may include a container (e.g., container (201)), a liner (e.g., liner (202)), a pump inlet (e.g., pump inlet (206)), a pump (e.g., pump (204)), a pump outlet (e.g., pump outlet (208)), a power source (e.g., power source (210)), a power switch (e.g., power switch (212)), one or more controller(s) (e.g., controller(s) (214)), a pressure sensor (e.g., pressure sensor (216)), and a power sensor (e.g., power sensor (218)). Similarly named components, shown in FIG. 2, have all of the same properties and functionalities as described above in FIG. 1. Accordingly, only additional components, properties, and functionalities will be described below.

In one or more embodiments of the invention, a power source (210) is a device that provides power (i.e., energy over a period of time) to one or more other devices (e.g., pump (204), power switch (212), controller(s) (214), and/or any other device needing power). The power source (210) may be operatively connected to a larger system that generates and provides power (e.g., an electrical socket connected to an electrical grid), a device that stores energy (e.g., a battery), or may generate power locally (e.g., a generator). In one or more embodiments of the invention, the power source (210) may provide power via electrical and/or mechanical means.

In one or more embodiments of the invention, a power switch (212) is a device capable of controlling the flow of power from a power source (210) to another device (e.g., pump (204), controller(s) (214), etc.). The power switch (212) may be configured to control the flow of power in binary states (i.e., on and off). Further, the power switch (212) may be configured to throttle the flow of power by reducing the current and/or voltage drawn from the power source (210) to any amount between no power (off) and fully powered (on).

In one or more embodiments of the invention, a controller (214) is a computing device. In one or more embodiments of the invention, a computing device includes one or more processor(s), memory, persistent storage, and communication interfaces (e.g., wired and/or wireless network interfaces). The persistent storage (and/or memory) may store computer instructions (e.g., computer code) which, when executed by the processor(s) of the computing device, cause the computing device to issue one or more requests and to receive one or more responses. Non-limiting examples of a computing device include a smart device, computer (e.g., single-board, tablet, laptop, desktop), mobile phone, server, distributed computing system, or cloud resource. In one or more embodiments of the invention, a controller (214) may include a clock capable of measuring time in one or more increments (e.g., milliseconds, seconds, minutes, hours, etc.). In one or more embodiments of the invention, a controller (214) may include a microphone, camera, monitor, touchscreen, keyboard, mouse, and/or any other human interface device.

In one or more embodiments of the invention, a pressure sensor (216) is a device that can measure a difference in pressure between two volumes (i.e., gauge pressure). In one or more embodiments of the invention, the pressure sensor (216) is disposed between (i) the volume outside of and surrounding the container (201) and (ii) the volume that exists between the liner (202) and the container (201) (the volume from which pump (204) vacuums fluids via pump inlet (206)). Accordingly, in such an embodiment, the pressure sensor (216) measures the difference in pressure between those two volumes (volumes (i) and (ii)). Further, the pressure sensor (216) may be operatively connected to a controller (214) and communicate the measured pressure data to the controller (214).

In one or more embodiments of the invention, the portion of the pressure sensor (216) located on the interior of the container (201) may be placed such that, even when the liner (202) is fully expanded, the pressure sensor (216) does not directly contact the liner (202) (e.g., located in the pump inlet (206), in a bottom-corner of the container (201), in an airflow distributor (not shown), etc.). Accordingly, the pressure sensor (216) may be exposed to the gaseous pressure inside the container (201) even when the liner (202) is fully expanded.

In one or more embodiments of the invention, a power sensor (218) is a device that can measure power drawn through an electrical connection. In one or more embodiments of the invention, the power sensor (218) is disposed between the power source (210) and the pump (204) such that the power sensor (218) measures the amount of power drawn by the pump (204) from the power source (210). Further, the power sensor (218) may be operatively connected to a controller (214) and communicate the measured power data to the controller (214).

In one or more embodiments of the invention, the pump (204), controller (214), power switch (212), pressure sensor (216), power sensor (218), and/or any combination thereof may be combined into a single device or groups of combined devices. As a non-limiting example, the power switch (212) and the power sensor (218) may be a single device that can both control the flow of power and measure the power traversing the device. As another non-limiting example, the pump (204), the power switch (212), and the controller (214) may be combined into a single device (e.g., a smart pump) having the capabilities of each of those constituent devices. One of ordinary skill in the art, having the benefit of this detailed description, would appreciate that any combination of the aforementioned discrete devices may be fabricated into a single device (e.g., sharing a printed circuit board, housing, peripherals, interface, etc.).

In one or more embodiments of the invention, the controller(s) (214) may be one device or two (or more) separate devices. As a non-limiting example, a first controller (214) may be a smart assistant device, and a second controller (214) may be a single-board computer. Continuing with the example, the smart assistant device may interact with a human to initiate a process on the single-board computer, which in turn, may be configured to turn the pump (204) on and off via a power switch (212).

While FIG. 2 shows a specific configuration of a system, other configurations may be used without departing from the scope of the invention. Accordingly, embodiments disclosed herein should not be limited to the configuration of devices and/or components shown in FIG. 2.

FIG. 3A

Figure 3C:
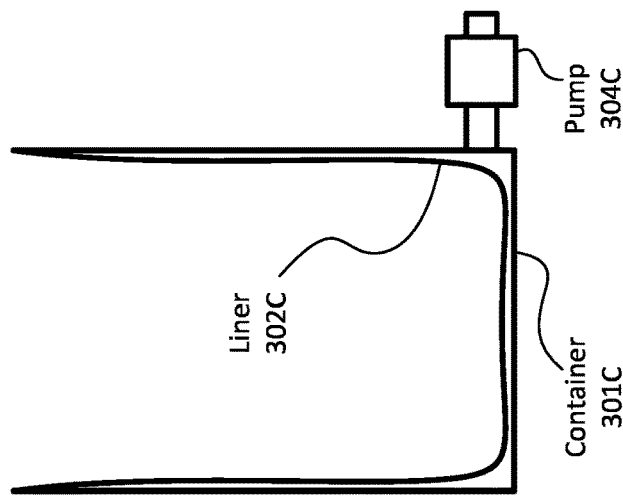
FIG. 3C shows a diagram of a container, in accordance with one or more embodiments of the invention.
Figure 3B:
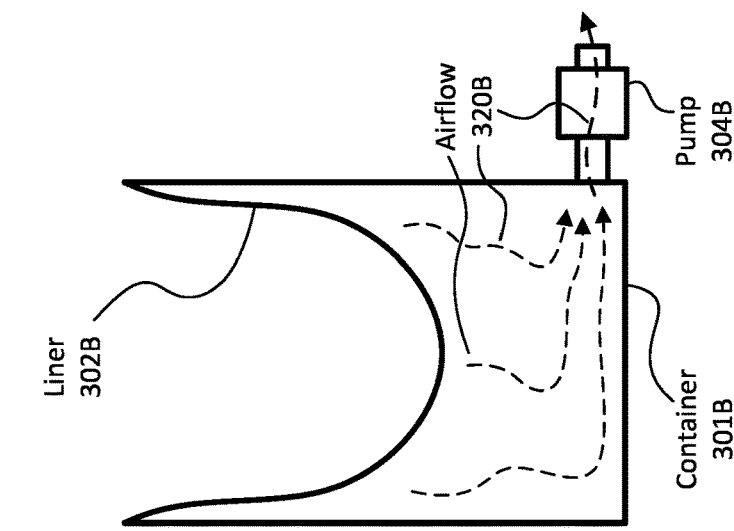
FIG. 3B shows a diagram of a container, in accordance with one or more embodiments of the invention.
Figure 3A:
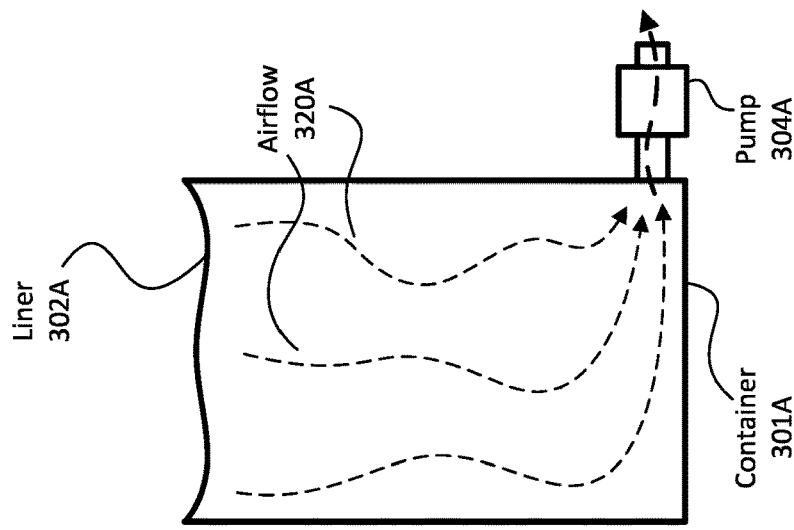
FIG. 3A shows a diagram of a container, in accordance with one or more embodiments of the invention.

FIG. 3A shows a diagram of a container, in accordance with one or more embodiments of the invention. A container (e.g., container (301A)) may include a liner (e.g., liner (302A)), airflow (e.g., airflow (320A)), and be connected to a pump (e.g., pump (304A)). Similarly named components, shown in FIG. 3A, have all of the same properties and functionalities as described above in FIG. 1. Accordingly, only additional components, properties, and functionalities will be described below.

In one or more embodiments of the invention, FIG. 3A shows a state of the container (301A) shortly after a liner (302A) is installed in an upper opening of the container (301A) and the pump (304A) is powered on. As a result of being powered on, the pump (304A) pulls air from inside the container (301A) (closed in by the liner (302A)) and moves that air outside of the container (301A) to the surrounding environment. Specifically, as depicted in FIG. 3A, airflow (320A) is shown moving from the upper parts of the container (301A) into the pump inlet, pump (304A), pump outlet, and to the surrounding environment.

While FIG. 3A shows a specific configuration of a system, other configurations may be used without departing from the scope of the invention. Accordingly, embodiments disclosed herein should not be limited to the configuration of devices and/or components shown in FIG. 3A.

FIG. 3B

FIG. 3B shows a diagram of a container, in accordance with one or more embodiments of the invention. A container (e.g., container (301B)) may include a liner (e.g., liner (302B)), airflow (e.g., airflow (320B)), and be connected to a pump (e.g., pump (304B)). Similarly named components, shown in FIG. 3B, have all of the same properties and functionalities as described above in FIG. 1. Accordingly, only additional components, properties, and functionalities will be described below.

In one or more embodiments of the invention, FIG. 3B shows a state of the container (301B) where the pump (304B) is powered on, and the liner (302B) is partially expanded into the container (301B). As a result of being powered on, the pump (304B) pulls fluid (air) from inside the container (301B) (closed in by the liner (302B)) and moves that fluid (air) outside of the container (301B) to the surrounding environment.

As depicted in FIG. 3B, the liner (302B) maintains contact with the upper opening of the container (301B) (e.g., via an elastic band, or other means for fixing) and the inner portion of the liner (302B) expands downward to fill the internal volume of the container (301B). Airflow (320B) is shown moving from the middle and lower parts of the container (301B) into the pump inlet, pump (304B), pump outlet, and to the surrounding environment. The liner (302B) expands downward due to the lower gaseous pressure inside the container (301B) created by the pump (304B) removing air from the container (301B) (i.e., airflow (320B)).

While FIG. 3B shows a specific configuration of a system, other configurations may be used without departing from the scope of the invention. Accordingly, embodiments disclosed herein should not be limited to the configuration of devices and/or components shown in FIG. 3B.

FIG. 3C

FIG. 3C shows a diagram of a container, in accordance with one or more embodiments of the invention. A container (e.g., container (301C)) may include a liner (e.g., liner (302C)), airflow (e.g., airflow (320C)), and be connected to a pump (e.g., pump (304C)). Similarly named components, shown in FIG. 3C, have all of the same properties and functionalities as described above in FIG. 1. Accordingly, only additional components, properties, and functionalities will be described below.

In one or more embodiments of the invention, FIG. 3C shows a state of the container (301C) where the pump (304C) is powered off, and the liner (302C) is fully expanded into the container (301C). As depicted in FIG. 3C, the liner (302C) maintains contact with the upper opening of the container (301C) (e.g., via an elastic band, or other means for fixing) and the inner portion of the liner (302C) is fully expanded to (mostly) fill the internal volume of the container (301C).

In one or more embodiments of the invention, as discussed in the description of FIG. 1, the liner (302C) may expand by unfolding a flexible material (e.g., a polypropylene trash bag). Accordingly, the liner (302C), as shown in FIG. 3B, maintains its expanded shape even though the pump (304C) is powered off and no longer pulling a vacuum between the liner (302C) and the container (301C).

While FIG. 3C shows a specific configuration of a system, other configurations may be used without departing from the scope of the invention. Accordingly, embodiments disclosed herein should not be limited to the configuration of devices and/or components shown in FIG. 3C.

FIG. 4A

Figure 4A:
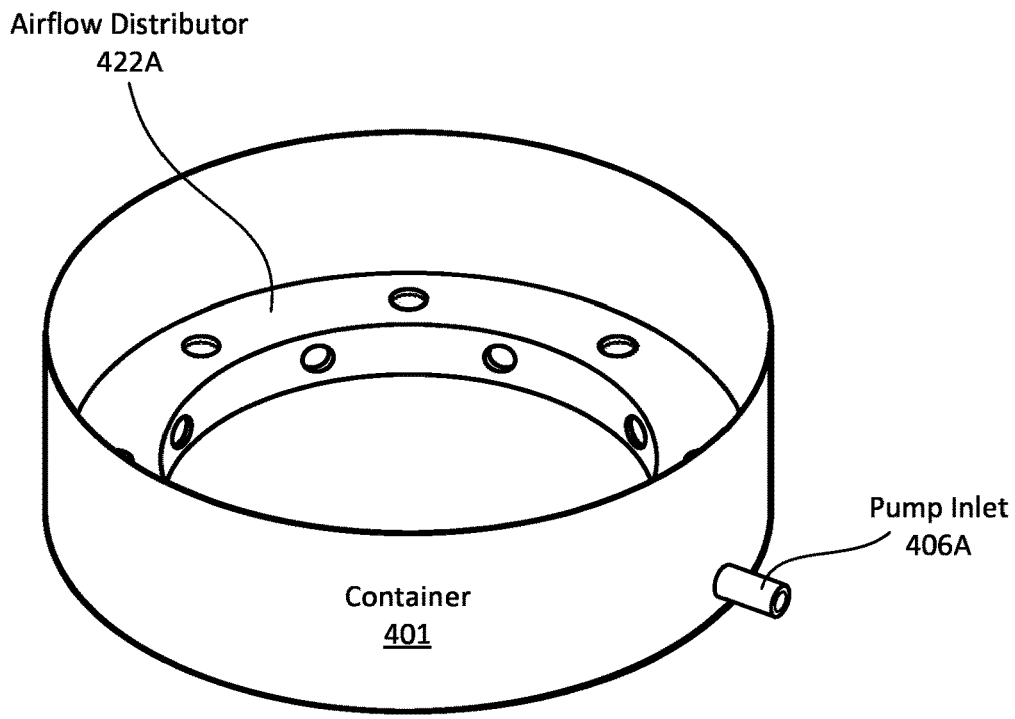
FIG. 4A shows a diagram of part of a container, in accordance with one or more embodiments of the invention.

FIG. 4A shows a diagram of part of a container, in accordance with one or more embodiments of the invention. A container (e.g., container (401)) may include a pump inlet (e.g., pump inlet (406A)) and an airflow distributor (e.g., airflow distributor (422A)). Similarly named components, shown in FIG. 4A, have all of the same properties and functionalities as described above in FIG. 1. Accordingly, only additional components, properties, and functionalities will be described below.

In one or more embodiments of the invention, an airflow distributor (422A) is a physical structure that distributes the airflow from inside the container (401) into the pump inlet (406A). An airflow distributor (422A) may be located in a container (401) and take a shape similar to a shape of the container (401). As a non-limiting example, the container (401) of FIG. 4A is depicted as cylindrical, accordingly the exterior walls of the airflow distributor (422A) are shown to be in a ring shape that match the internal contours of the container (401). In one or more embodiments of the invention, an airflow distributor (422A) may be placed in the container (401) at an end of the container (401) opposite the container opening where the liner is installed. Additional details regarding the airflow distributor (422A) may be found in the description of FIG. 4B.

While FIG. 4A shows a specific configuration of a system, other configurations may be used without departing from the scope of the invention. As an example, the airflow distributor (422A) may be any shape and size within the container (401). The airflow distributor (422A) may extend upward towards an upper opening of the container (401) (not shown). The airflow distributor (422A) may be disk-shaped and cover the bottom-interior of the container (401) (instead of ring-shaped, as shown). One of ordinary skill in the art, having the benefit of this detailed description, would appreciate that countless possible designs may be used for the shape and size of the airflow distributor (422A) within the container (401). Accordingly, embodiments disclosed herein should not be limited to the configuration of devices and/or components shown in FIG. 4A.

FIG. 4B

Figure 4B:
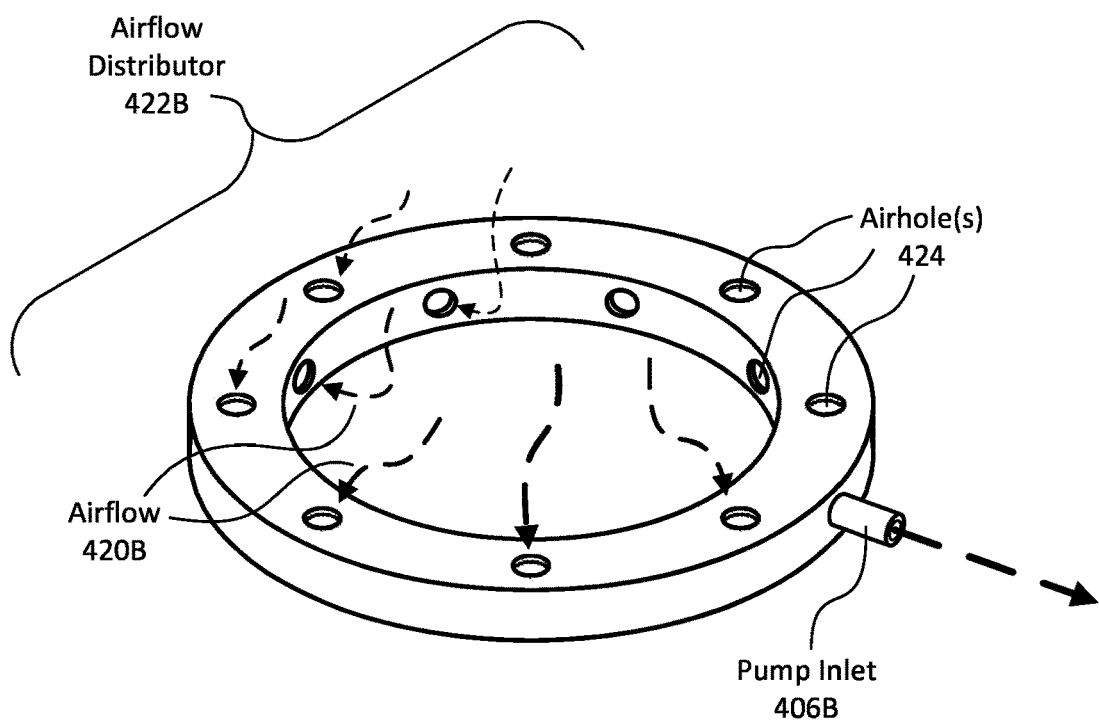
FIG. 4B shows a diagram of an airflow distributor, in accordance with one or more embodiments of the invention.

FIG. 4B shows a diagram of an airflow distributor, in accordance with one or more embodiments of the invention. An airflow distributor (e.g., airflow distributor (422B)) may include one or more airhole(s) (e.g., airholes(s) (424)) and be connected to a pump inlet (e.g., pump inlet (406B)). Each of these components is described below.

In one or more embodiments of the invention, an airflow distributor (422B) is a physical structure that distributes the airflow (420B) inside the container into the pump inlet (406B). The airflow distributor (422B) may include a hollow interior volume that allows for fluids to flow from one or more inlets (e.g., airhole(s) (424)) and exit via one or more outlets (e.g., pump inlet (406B)).

In one or more embodiments of the invention, one or more airhole(s) (424) may be disposed around the surface of the airflow distributor (422B) to provide multiple independent paths for airflow (420B) to exit the container. Accordingly, if one or more airhole(s) (424) were to be partially or fully obstructed (thereby blocking airflow (420B) through the obstructed airhole(s)), one or more other non-obstructed airhole(s) would continue to allow fluids to flow freely therethrough. Accordingly, in one or more embodiments of the invention, airhole(s) (424) may be placed on opposite sides of the airflow distributor (422B) to reduce the likelihood of concurrent obstruction. Further, distributing airhole(s) (424) throughout the airflow distributor (422B) may allow for the liner (not shown) to be expanded evenly, as the liner is drawn towards multiple suction points.

In one or more embodiments of the invention, there may be only a single "airhole" (424). As a non-limiting example, a single airhole (424) may be an elongated channel that carves a single opening into the airflow distributor (422B). Accordingly, if a portion of the single airhole (424) is obstructed, other portions of the single airhole (424) may remain unobstructed and continue to allow for airflow (420B). As another non-limiting example, each of the airholes (424) shown in FIG. 4B may be connected by a channel thereby forming a single "airhole".

As another non-limiting example, an airflow distributor (422B) may be a simple wye ("Y"-shaped) or tee ("T"-shaped) pipe fitting, connected to the pump inlet (406B), that provides two airholes (424). Further, as another non-limiting example, an airflow distributor (422B) may be a series of (two or more) wye or tee pipe fittings that provide three or more airholes (424). One of ordinary skill in the art, having the benefit of this detailed description, would appreciate that countless possible designs may be used for the number, shape, size, and placement of the airhole(s) (424) on an airflow distributor (422B).

While FIG. 4B shows a specific configuration of a system, other configurations may be used without departing from the scope of the invention. Accordingly, embodiments disclosed herein should not be limited to the configuration of devices and/or components shown in FIG. 4B.

FIG. 5

Figure 5:
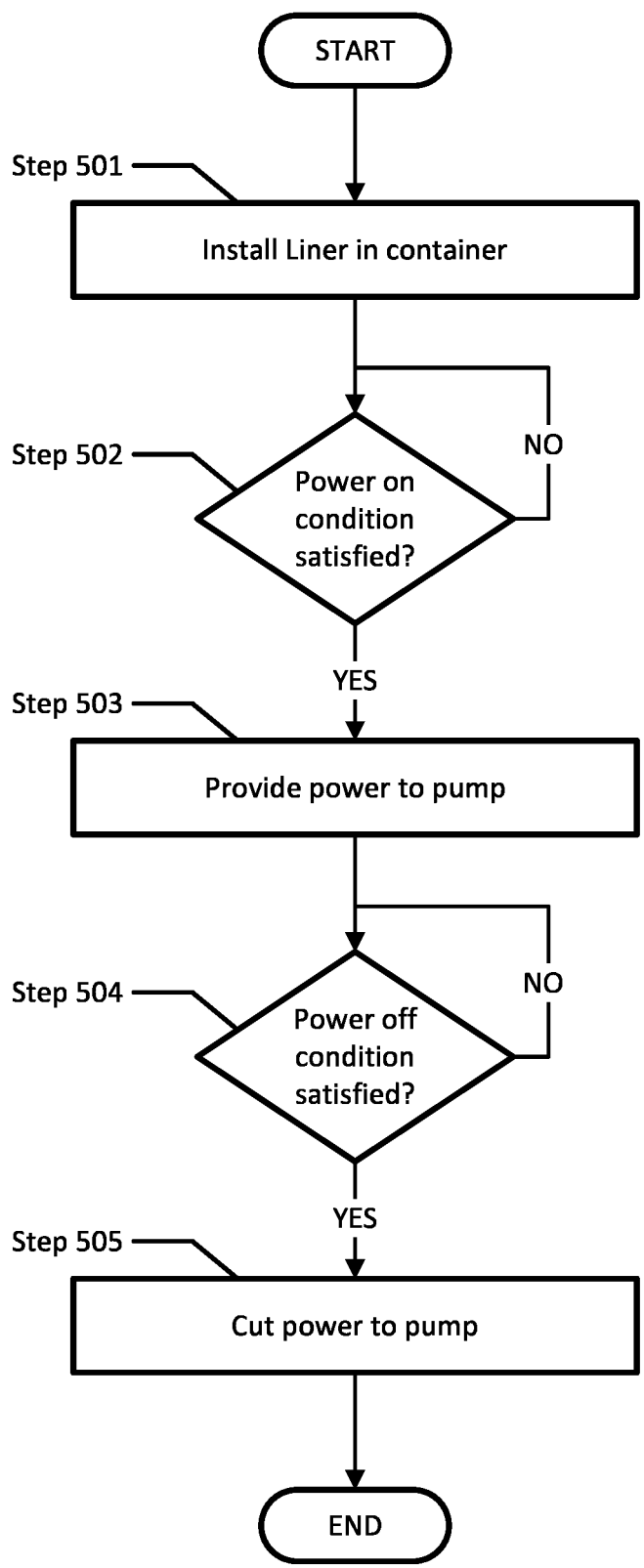
FIG. 5 shows a flowchart of a method of filling a container with a liner, in accordance with one or more embodiments of the invention.

FIG. 5 shows a flowchart of a method of filling a container with a liner, in accordance with one or more embodiments of the invention. All or a portion of the method shown in FIG. 5 may be performed by one or more components discussed in the description of FIGS. 1, 2, 3A, 3B, 3C, 4A, 4B, and/or a user one of those components. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 501, a liner is installed in a container. Non-limiting examples of installing a liner into the container include (i) a user installing a trash bag into a trash can (e.g., stretching an elastic band of the trash bag over an opening of the trash can), (ii) a user stretching a balloon over the opening of a bottle, (iii) an industrial automation machine affixing the edge of a plastic liner around a canister opening.

In Step 502, a controller makes a determination as to whether a power on condition is satisfied. In one or more embodiments of the invention, a power on condition is a prerequisite that must be satisfied prior to providing power to the pump (Step 503).

In one or more embodiments of the invention, the container may include one or more sensors to detect the installation of a liner. Accordingly, as a non-limiting example, the power on condition may be satisfied by the detection of the installation of the liner.

In one or more embodiments of the invention, a power on condition may be a command to provide power to the pump, received by a controller. In one or more embodiments, generation of a command to provide power to the pump may be initiated by interaction with a user (e.g., a human). As a non-limiting example, a button may be made available to the user, which when pressed, sends a command to a controller to provide power to the pump (thereby satisfying the power on condition).

As another non-limiting example, a controller may be a smart device which may accept voice and/or motion commands from a user (i.e., via microphone and/or camera, respectively). In such an example, a user may audibly articulate a series of coherent expressive statements (e.g., "hey assistant, suck trash!") and/or move their body (e.g., motion a particular sign with their hands, perform a certain dance, etc.) which the smart assistant may interpret as a command to provide power to the pump (or may cause the smart assistant to send a command to another controller to provide power to the pump).

If the power on condition is not satisfied (502-No), the controller does not proceed until the power on condition is satisfied. However, if the power on condition is satisfied (502—Yes), the method proceeds to Step 503.

In Step 503, the controller initiates providing power to the pump. In one or more embodiments of the invention, the controller may initiate providing power to the pump by sending a command to a power switch (e.g., a smart plug, a smart outlet, a smart power switch integrated into the pump, etc.) to allow power to flow through the power switch. Consequently, upon receipt of the command, the smart power switch enables the flow of power from the power source to the pump.

One of ordinary skill in the art, having the benefit of this detailed description, would appreciate that the power switch, and the method to control it, may take varying forms. As a non-limiting example, the power switch may be a physical toggle switch which a robotic arm may toggle on or off. In such an example, the controller would send a command to move the robotic arm, which in turn, physically controls the power switch.

In Step 504, a controller makes a determination as to whether a power off condition is satisfied. In one or more embodiments of the invention, a power off condition is a prerequisite that must be satisfied prior to cutting power to the pump (Step 505). A non-limiting example of a power off condition is a command received by the controller to cut power to the pump.

In one or more embodiments of the invention, the power off condition may be satisfied when a time threshold is met (as used herein, "meeting" a threshold also includes exceeding that threshold). As a non-limiting example, if the pump moves air at a flow rate of 78 gallons per minute (1.3 gallons per second), and the container volume is 13 gallons (e.g., a 13-gallon trash can), the pump would be able to remove 13 gallons of air from inside the container in 10 seconds. Accordingly, the time threshold may be set to 10 seconds to allow for a sufficient duration of time for a 13-gallon trash bag to fully expand in the trash can. In such scenarios, the controller may measure the duration of time that has elapsed since the pump was provided power (Step 503) and determine when the measured time duration meets the time threshold (e.g., 10 seconds), thereby satisfying the power off condition.

In one or more embodiments of the invention, the power off condition may be satisfied when a pressure threshold is met. In such embodiments, the pressure threshold is compared against the pressure differential measured by the pressure sensor. As discussed in the description of FIG. 1, the pressure sensor may measure the difference in gaseous pressure between the volume surrounding the container and the volume inside the container (between the container and the liner). In one or more embodiments of the invention, after the liner is nearly fully expanded, the pump begins to pull a partial vacuum on the remaining gas inside the container. In such scenarios, the controller may record the pressure difference (via the pressure sensor), and determine when that pressure difference meets the pressure threshold, thereby satisfying the power off condition.

In one or more embodiments of the invention, the power off condition may be satisfied when a power threshold is met. A power threshold may be a threshold of (i) the absolute power drawn at any point in time (i.e., based on the instant measured power draw), or (ii) a relative power drawn over time (i.e., based on an increase in the instant measured power draw compared to an earlier point in time).

In one or more embodiments of the invention, when initially expanding the liner, the pump draws a (relatively) constant amount of power (i.e., a steady-state power draw) with little (or no) resistance. Then, after the liner is nearly fully expanded, the pump begins to pull a partial vacuum on the remaining gas inside the container. When pulling a partial vacuum, the pump may draw more power than the steady-state power draw.

As a non-limiting example, consider a scenario where a pump has a steady-state power draw of 10 watts, but may draw up to 30 watts when pulling a partial vacuum. Continuing with the example, the power threshold is an absolute power threshold set at 15 watts. Accordingly, when the liner is fully expanded, and the pump begins to pull a partial vacuum, the power drawn by the pump increases from 10 watts to, at least, 15 watts—thereby meeting the power threshold and satisfying the power off condition.

As another non-limiting example, consider a scenario where a controller is not programmed to include any information about the pump (i.e., the steady-state power draw is not stored). However, it may be assumed that the pump draws, at least, 200% of the steady-state power draw when pulling a partial vacuum. Continuing with the example, the power threshold may be set at a relative power draw of 150% of the steady-state power draw. Accordingly, when the pump starts (Step 503), the power sensor measures the power draw (e.g., 20 watts) while the pump initially expands the liner. The controller then records the power sensor data to calculate a steady-state power draw (e.g., the average of power measurements over some time period). Then, using that calculated steady-state power draw (20 watts), the controller calculates a power threshold that is 150% the calculated steady-state power draw (30 watts). Accordingly, when the liner is fully expanded, and the pump begins to pull a partial vacuum, the amount of power drawn is assumed to increase to, at least, 30 watts—thereby meeting the power threshold and satisfying the power off condition.

If the power off condition is not satisfied (504-No), the controller continues to wait and does not proceed until the power off condition is satisfied. However, if the power off condition is satisfied (504—Yes), the method proceeds to Step 505.

In Step 505, the controller initiates cutting power to the pump. In one or more embodiments of the invention, the controller may initiate cutting power to the pump by sending a command to a power switch (e.g., a smart plug, a smart outlet, a smart power switch integrated into the pump, etc.) to stop the flow of power through the power switch. In turn, upon receipt of the command, the smart power switch disables the flow of power from the power source to the pump. The process may end following Step 505.

FIG. 6

Figure 6:
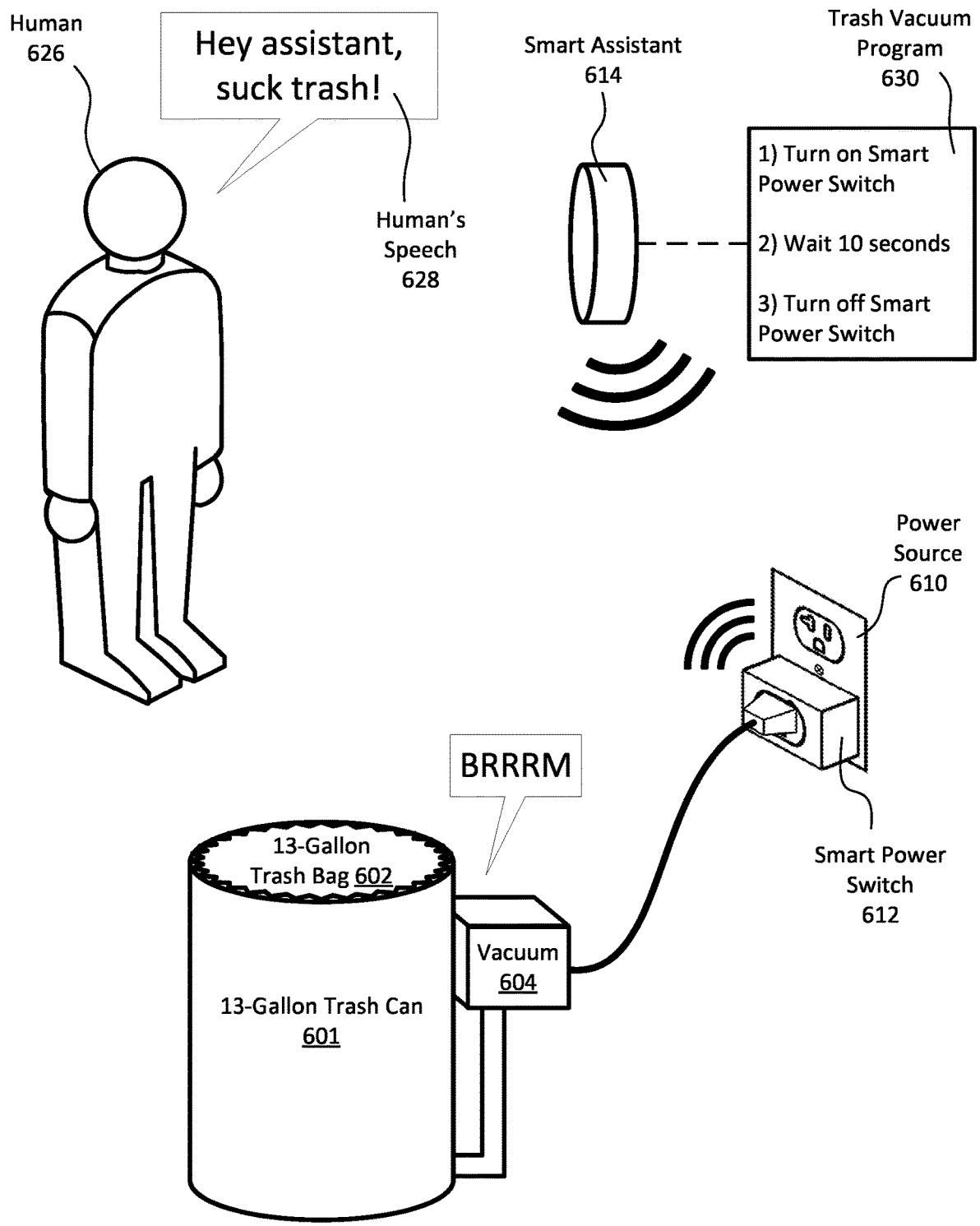
FIG. 6 shows an example of filling a container with a liner, in accordance with one or more embodiments of the invention.

FIG. 6 shows an example of filling a container with a liner, in accordance with one or more embodiments of the invention. The following use case is for explanatory purposes only and not intended to limit the scope of the invention to this embodiment.

In FIG. 6, consider a scenario in which, at a first step, a human installs a 13-gallon trash bag (602) in a 13-gallon trash can (601). Subsequently, the human (626) says "hey assistant, suck trash!" (human's speech (628)) out loud in the presence of a smart assistant (614). Further, the smart assistant (614) includes a microphone that is able to listen to and record the human's speech (628).

In response to listening to the human's speech (628), the smart assistant (614) interprets the recorded noises and identifies a program (i.e., trash vacuum program (630)) associated with the human's speech (628). Accordingly, the smart assistant (614) is configured to initiate the trash vacuum program (630), which includes: (1) turning on the smart power switch (612), (2) waiting 10 seconds, and then (3) turning off the smart power switch (612).

To complete step (1), the smart assistant (614) sends a command to the smart power switch (612) to allow power to flow to the vacuum (604). The smart assistant (614) may communicate with the smart power switch (612) using one or more means of wireless and/or wired communication.

After the smart assistant (614) performs step (1) (turning on the power switch), the smart assistant (614) performs step (2)—waiting (i.e., pausing, idling) for 10 seconds. Thus, while step (2) is in progress (during the 10 second pause), the smart power switch (612) continues to allow power to flow from the power source (610) to the vacuum (604). Consequently, the vacuum (604) pulls air from inside the 13-gallon trash can (601) and the 13-gallon trash bag (602) expands to fill the volume inside the 13-gallon trash can (601).

In the example of FIG. 6, the vacuum (604) is able to pump air at a flow rate of 78 gallons per minute (1.3 gallons per second). Accordingly, after 10 seconds have elapsed, 13 gallons of air are removed from the 13-gallon trash can (601). Further, after 10 seconds have elapsed (and step (2) is completed), the smart assistant (614) performs step (3) by sending a command to the smart power switch (612) to cut the flow of power from the power source (610) to the vacuum (604).

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A system, comprising:
    a container, comprising:
        a first opening, adapted to accept a liner;
    a pump connected to the container; and
    a controller, wherein the controller is programmed to perform a method for filling the container with the liner, comprising:
        making a first determination that a power on condition is satisfied,
            wherein prior to making the first determination, the liner is installed in the first opening of the container; and
        in response to the first determination, providing power to the pump,
        wherein after providing the power to the pump:
            the liner expands inside an interior of the container, and
        wherein after the liner expands inside the interior of the container:
            making a second determination that a power off condition is satisfied; and
            in response to the second determination, cutting the power to the pump,
        wherein the pump moves a gas from a first volume inside the container to a second volume surrounding the container.

2. The system of claim 1, wherein the first volume exists between the container and the liner, wherein the gas moves through an airflow distributor prior to moving to the second volume, and wherein the airflow distributor is located in the first volume.

3. The system of claim 1, wherein the power off condition is satisfied when:
    a time threshold is exceeded;
    a pressure threshold is exceeded; or
    a power threshold is exceeded.

4. A non-transitory computer readable medium comprising instructions which, when executed by a computer processor, enables the computer processor to perform a method for filling a container with a liner, comprising:
    making a first determination that a power on condition is satisfied,
        wherein prior to making the first determination, the liner is installed in a first opening of the container; and
    in response to the first determination, providing power to a pump,
    wherein after providing the power to the pump:
        the liner expands inside an interior of the container, and
    wherein after the liner expands inside the interior of the container:
        making a second determination that a power off condition is satisfied; and
        in response to the second determination, cutting the power to the pump,
    wherein the pump moves a gas from a first volume inside the container to a second volume surrounding the container.

5. The non-transitory computer readable medium of claim 4, wherein the first volume exists between the container and the liner, wherein the gas moves through an airflow distributor prior to moving to the second volume, and wherein the airflow distributor is located in the first volume.

6. The non-transitory computer readable medium of claim 4, wherein the power off condition is satisfied when:
    a time threshold is exceeded;
    a pressure threshold is exceeded; or
    a power threshold is exceeded.

7. A method for filling a container with a liner, comprising:
    making a first determination that a power on condition is satisfied,
        wherein prior to making the first determination, the liner is installed in a first opening of the container; and
    in response to the first determination, providing power to a pump,
    wherein after providing the power to the pump:
        the liner expands inside an interior of the container, and
    wherein after the liner expands inside the interior of the container:
        making a second determination that a power off condition is satisfied; and
        in response to the second determination, cutting the power to the pump,
    wherein the pump moves a gas from a first volume inside the container to a second volume surrounding the container.

8. The method of claim 7, wherein the power on condition is satisfied when a controller receives a command to provide the power to the pump.

9. The method of claim 7, wherein the power off condition is satisfied when a time threshold is exceeded.

10. The method of claim 9, wherein the time threshold is based a size of the liner and a flow rate of the pump.

11. The method of claim 7, wherein the power off condition is satisfied when a pressure threshold is exceeded.

12. The method of claim 11, wherein the pressure threshold is based on a pressure difference between the first volume inside the container and the second volume surrounding the container, wherein the first volume exists between the container and the liner.

13. The method of claim 7, wherein the power off condition is satisfied when a power threshold is exceeded.

14. The method of claim 13, wherein the power threshold is calculated based on a steady-state draw.

15. The method of claim 7, wherein the first volume exists between the container and the liner.

16. The method of claim 15, wherein the gas moves through an airflow distributor prior to moving to the second volume.

17. The method of claim 16, wherein the airflow distributor is located in the first volume.

18. The method of claim 17, wherein the airflow distributor is located at an end of the container opposite the first opening.

19. The method of claim 18, wherein the airflow distributor comprises a first airhole and a second airhole.

20. The method of claim 19, wherein the first airhole and the second airhole are located on opposite sides of the airflow distributor.

\* \* \* \* \*